Figure 1:
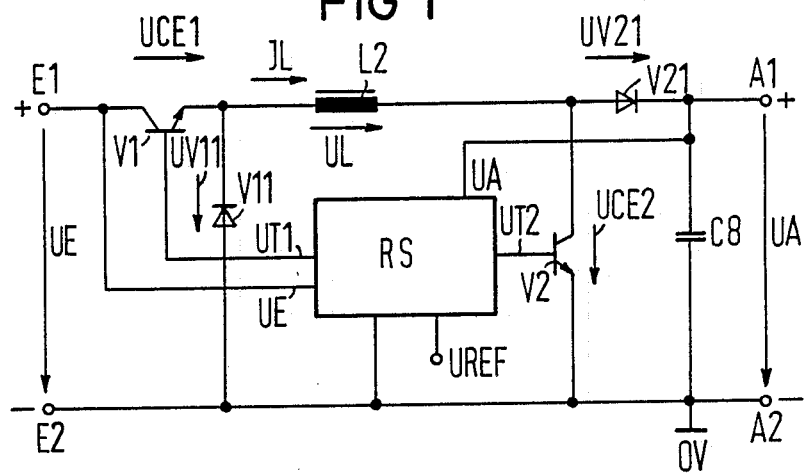

United States Patent [19]

Obergfell et al.

[11] Patent Number: 4,967,138
[45] Date of Patent: Oct. 30, 1990

[54] SWITCHED-MODE REGULATOR WITH INDUCTOR CURRENT SIMULATION CIRCUIT

[75] Inventors: Rainer Obergfell, Laugna/Bocksberg; Hubert Panse; Wolfgang Schlegel, both of Munich, all of Fed. Rep. of Germany

[73] Assignee: Siemens Aktiengesellschaft, Berlin and Munich, Fed. Rep. of Germany

[21] Appl. No.: 442,362
[22] PCT Filed: Mar. 15, 1988
[86] PCT No.: PCT/DE88/00/56
§ 371 Date: Oct. 20, 1989
§ 102(e) Date: Oct. 20, 1989
[87] PCT Pub. No.: WO88/08638
PCT Pub. Date: Nov. 3, 1988

[30] Foreign Application Priority Data

Apr. 22, 1987 [DE] Fed. Rep. of Germany ....... 3713540

[51] Int. Cl.[5] ............................................. H02M 3/158
[52] U.S. Cl. ..................................... 323/224; 323/271; 323/286; 323/299
[58] Field of Search ................ 323/220, 222, 224, 271, 323/286, 287, 299; 363/79, 80, 81, 89

[56] References Cited

U.S. PATENT DOCUMENTS

| | | |
|---|---|---|
| 3,641,422 | 2/1972 | Fransworth et al. |
| 4,459,539 | 7/1984 | Cordy ................................. 323/299 |
| 4,536,700 | 8/1985 | Bello et al. ......................... 323/288 |
| 4,591,963 | 5/1986 | Retotar ................................ 363/98 |
| 4,618,812 | 10/1986 | Kawakami ......................... 323/224 |
| 4,668,905 | 5/1987 | Schierjott ........................... 323/287 |
| 4,717,994 | 1/1988 | Diaz et al. .......................... 323/299 |

FOREIGN PATENT DOCUMENTS 1905369 8/1970 Fed. Rep. of Germany.
3427520 2/1986 Fed. Rep. of Germany.

OTHER PUBLICATIONS

Patent Abstracts of Japan, vol. 6, No. 21 (E-93), (899), Feb. 6, 1982.
"Halbleiterschaltungstechnik" (Semiconductor Circuitry), by Tietze and Schnek, 5th Edition, Chapter 16.5.1.

Primary Examiner—William H. Beha, Jr.
Attorney, Agent, or Firm—Jeffrey P. Morris

[57] ABSTRACT

A circuit for the conversion of an unregulated input voltage (UE) into a regulated DC output voltage (UA) is specified, with which the input voltage (UE) can assume both a higher and a lower value than the desired output voltage (UA). In addition to a set/actual value comparator (SIV), a current simulation (SNB) is provided, which simulates the current (JL) in the storage choke (L2) during charging as capacitor voltage, a common driver circuit (TRS), designed as switched constant current source, for both semiconductor switches (V1, V2), an input voltage monitoring (ESÜ), which switches off the switched-mode regulator when there is too low an input voltage (UE) and an output monitoring circuit (ASÜ), which reduces the set value of the regulating circuit on crossing in the downward direction of a selectable threshold.

5 Claims, 3 Drawing Sheets

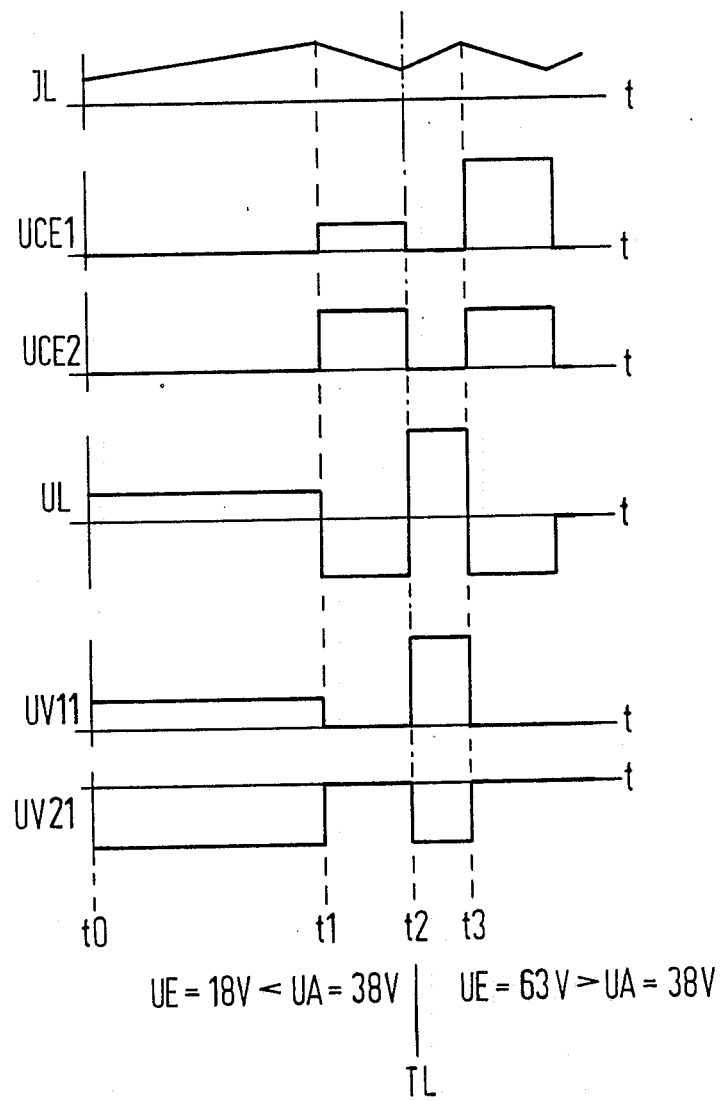

SWITCHED-MODE REGULATOR WITH INDUCTOR CURRENT SIMULATION CIRCUIT

The invention relates to a secondary switched-mode regulator according to the preamble of patent claim 1.

Secondary switched-mode regulators serve for the generation of a regulated output voltage from an unregulated input voltage, there being no electrical isolation between the input and the output, in contrast to the primary-clocked switched-mode power supplies. Secondary switched-mode regulators may be designed as step-up converters or as step-down converters. In the case of the first, the output voltage is higher, in the case of the step-down converter the output voltage is lower than the respectively applied input voltage. The design and operating principle of secondary switched-mode regulators, in particular of the two embodiments as step-up converter and step-down converter, are described in the book "Halbleiterschaltungstechnik" (Semiconductor circuitry) by Tietze and Schenk, 5th edition, chapter 16.5.1.

If the DC input voltage varies in a wide tolerance zone around the value of the output voltage or if the input voltage is to be converted into a DC output voltage such that the input voltage can have both a higher and a lower value than the output voltage, it is known from German Offenlegungsschrift No. 1,905,369 to combine step-down converters and step-up converters. The control of each of the two semiconductor switches is in this case performed via a dedicated device known per se for a fixed or varyingly adjustable pulse duty factor, so that the attainable magnitude of the output voltage is either greater than, equal to or less than the input voltage.

In this case, a common clock frequency and the keeping of the same turn-on times can be used for both semiconductor switches.

The object of the invention is to specify a circuit arrangement for the conversion of an unregulated DC input voltage into a regulated DC output voltage using a secondary switched-mode regulator designed as a combined step-up/step-down converter, which is cost-effective to produce and the power loss of which is reduced.

This object is achieved according to the invention by the features specified in patent claim 1.

Advantageous configurations and further developments are defined in the subclaims.

Due to a simulation circuit, which simulates the current in the inductance (storage choke) during the charging of the inductance as capacitor voltage, lossy current sensing resistors or complex current transformer circuits (transformers) are avoided.

An input voltage monitoring which switches off the entire transformer when the input voltage is too low offers a reliable protection against the possible dropping of the input voltage to values which are far below the permissible minimum voltage and which would lead to the impermissible increasing of the input current to be connected.

A further advantage is that a common driver circuit is used for both semiconductor switches (switching transistors) and, as a result, a power loss reduction in comparison with conventional driver circuits is achieved.

If a selectable threshold is crossed in the downward direction, the set value of the regulating circuit is reduced and at the same time a so-called soft start is also achieved. Such an output monitoring circuit has the advantage that, as a result, the transformer is absolutely short-circuit-proof and conditionally also overload-proof. Consequently, a lower thermal loading is produced in the event of a short-circuit than in the case of full load. In the case of an overload, the current limitation is generally achieved by the simulation circuit.

Figure 2:
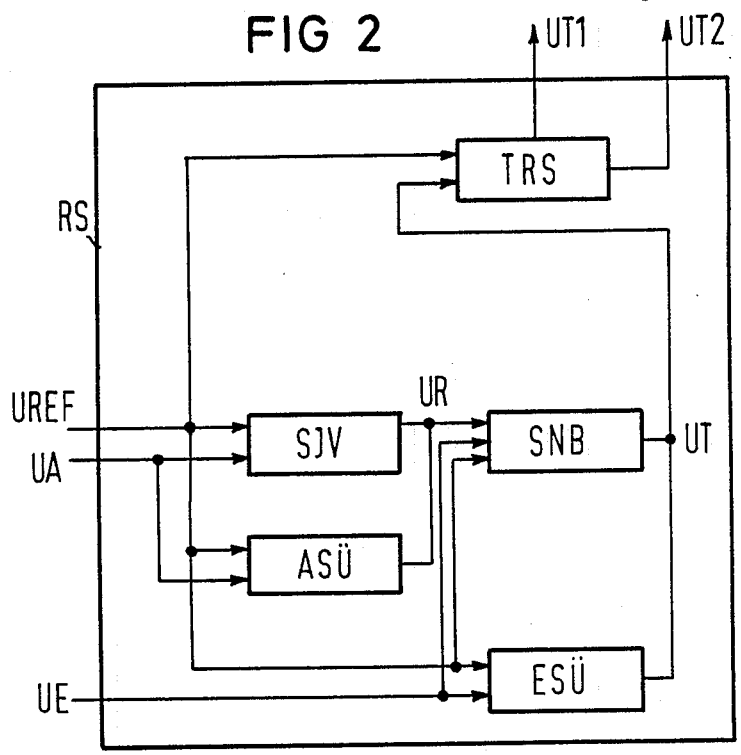
Figure 3:
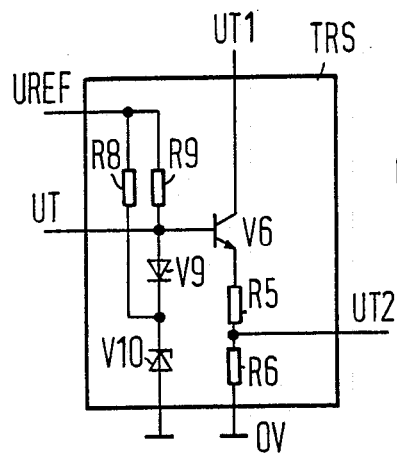
Figure 4:
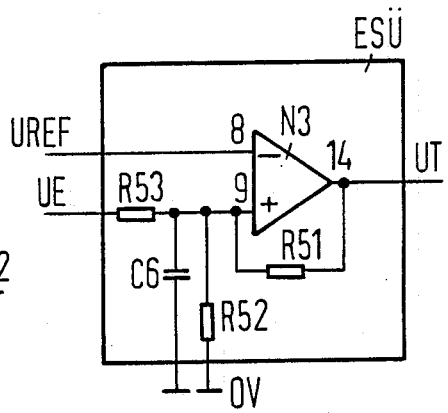
Figure 5:
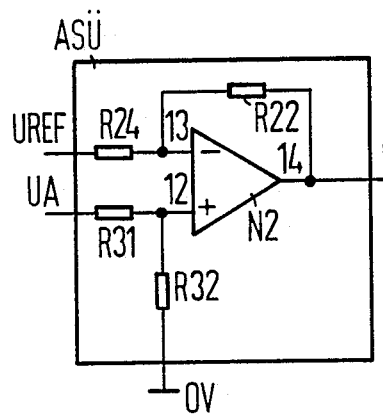
Figure 6:
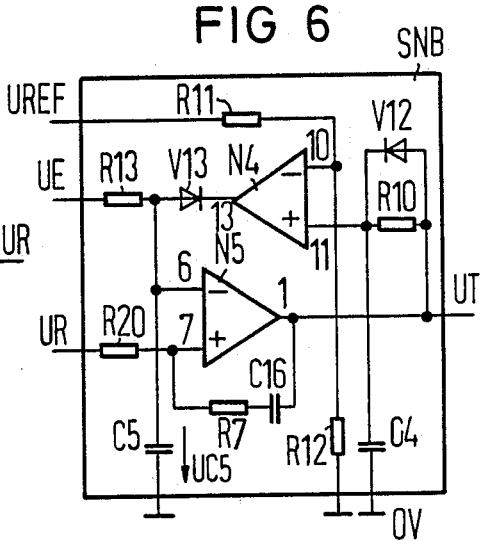

The invention is now explained in more detail with reference to the drawing, in which:

FIG. 1 shows a combined secondary switched-mode regulator as step-up/step-down converter, FIG. 2 shows a block circuit diagram of the regulating circuit used for such a secondary switched-mode regulator, FIG. 3 shows a driver circuit for the switching transistors, FIG. 4 shows a circuit for the input voltage monitoring, FIG. 5 shows a circuit for the output voltage monitoring, FIG. 6 shows a simulation circuit and FIG. 7 shows a pulse diagram for selected points within the circuit arrangement according to FIG. 1.

The secondary switched-mode regulator represented in FIG. 1 has two input terminals E1 and E2, at which an unregulated DC input voltage UE is available, as well as output terminals A1, A2, at which a regulated DC output voltage UA can be picked off. The input terminal E2 and the output terminal A2 are interconnected and form a reference potential OV. The input terminal E1 is connected via the collector-emitter junction of a first semiconductor switch, for example of a switching transistor V1, via an inductance L2, serving as storage choke, and furthermore via a diode V21, poled in forward direction, to the output terminal A1. The anode of the diode V21 is connected via the collector-emitter junction of a further semiconductor switch, for example likewise of a switching transistor V2, to the reference potential OV. A smoothing capacitor C8 is connected between the output terminals A1 and A2. The emitter terminal of the switching transistor V1 is connected via a freewheeling diode V11, poled in reverse direction, to the reference potential OV. A regulating circuit RS, which serves, inter alia, to keep the output voltage UA constant, is connected both to the input voltage UE and to the output voltage UA and the reference potential OV. In addition, a reference voltage UREF is also available as input variable for the regulating circuit RS. As output variable of the regulating circuit RS, the driver signals UT1 and UT2 are connected to the base terminals of the respective switching transistors V1 and V2. Furthermore, the voltages UCE1 and UCE2 at the collector-emitter junctions of the two switching transistors V1 and V2, as well as the voltages UV11 and UV21 at the diodes V11 and V21 are drawn in. The current through the inductance L2 is denoted by IL.

FIG. 2 shows the block circuit diagram of the regulating circuit RS used in the circuit arrangement according to FIG. 1. This regulating circuit RS includes a set/actual value comparator SIV, an input voltage monitoring circuit ESÜ, an output voltage monitoring ASÜ, a simulation circuit SNB and a driver circuit TRS. The set/actual value comparator SIV, at which the reference voltage UREF and the output voltage UA are available as input variables, emits the regulating voltage UR. Connected in parallel with the set/actual value comparator SIV is the output voltage monitoring ASÜ, the output of which is connected to the regulating voltage UR. The input voltage UE and the reference voltage UREF are available at the input voltage monitoring ESÜ. A driver voltage UT can be picked off at the output of the input voltage monitoring ESÜ. The regulating voltage UR, the input voltage UE and the reference voltage UREF represent the input variables, the driver voltage UT represents the output variable of the simulation circuit SNB. The reference voltage UREF, together with the driver voltage UT, forms the input variables for the driver circuit TRS, which emits two driver signals UT1 and UT2 for the switching of the two switching transistors V1 and V2.

Exemplary embodiments of the individual circuit components included in the regulating circuit RS are represented in more detail below.

Here, FIG. 3 shows the common driver circuit TRS for the two switching transistors V1 and V2. It includes a transistor V6, the base terminal of which is connected directly to the driver voltage UT. Furthermore, this base terminal is both connected via a resistor R9 to the reference voltage UREF, and via a diode V9, poled in forward direction, and a Z-diode V10, poled in reverse direction, to the reference potential OV. A line point, which lies between the cathodes of the two diodes V9 and V10 but is not denoted any more closely, is connected via a resistor R8 to the reference voltage UREF. The collector-emitter junction of the transistor V6 is connected via a series circuit, consisting of the resistors R5 and R6, to the reference potential OV. The driver signal UT1 is available at the collector terminal of the transistor V6 and the driver signal UT2 is available at the interconnection point of the resistors R5 and R6. With the aid of these two driver signals UT1 and UT2, the switching transistors V1 and V2 are either controlled directly or by insertion of driver stages known per se and therefore not represented. The driver circuit TRS is consequently realised as a switched constant-current source, which drives both switching transistors V1 and V2 simultaneously and, as a result, the losses in the connected driver circuit are only proportional to the input voltage UE. While the collector-emitter voltage can change at the transistor V6 by a relatively large amount, the collector current of the transistor V6 remains approximately constant. The voltage at the Z-diode V10 corresponds to the voltage at the two resistors R5 and R6. Such a driver circuit TRS, connected as constant-current source, has a very great dynamic internal resistance and relieves the comparators N1 and N3 at the driver voltage UT.

FIG. 4 shows the circuit arrangement for the input voltage monitoring ESÜ, at which the reference voltage URF and the input voltage UE are available and which switches off the transformer at too low input voltage UE. For this purpose, the reference voltage UREF is passed to an inverting input 8 of an operational amplifier N3, operating as comparator, and the input voltage UE is available via a resistor R53 at a noninverting input 9 of the comparator N3. A resistive coupling between the output 14 and the non-inverting input 9 of the comparator N3 by means of the resistor R51 produces a slight hysteresis and thus improves the switching performance of the comparator N3. At the input 9 of the comparator N3 there is, furthermore, a parallel circuit, consisting of resistor R52 and capacitor C6. The resistors R53 and R52 form an input voltage divider and thus reduce the input voltage UE to values of the order of magnitude of the reference voltage UREF. The capacitor C6, together with the resistor R53, forms a low-pass filter with the object of avoiding disturbances on the input side, such as are caused for example by external switching operations, and, as a result, to protect the input voltage monitoring circuit ESÜ against undesired response. In the normal case, the input voltage UE is always greater than the reference voltage UREF. Consequently, the voltage at the non-inverting input 9 is also greater than the reference voltage UREF and the output 14 of the comparator N3 is at "high" potential, i.e. the driver voltage UT makes possible a response of the two switching transistors V1 and V2 via the driver circuit TRS. On dropping of the input voltage UE to values which lie far below the permissible minimum voltage ("brown-out"), the reference voltage UREF becomes greater than the input voltage UE and the output 14 of the comparator N3 is at "low" potential and consequently the switching transistors V1 and V2 go over into the blocking state, i.e. the transformer is switched off.

In FIG. 5, the circuit arrangement for output voltage monitoring ASÜ is represented. This has an operational amplifier N2 with degenerative feedback, at the non-inverting input 12 of which the output voltage UA is available via a resistor R31. At the inverting input 13, the reference voltage UREF is connected via a resistor R24. A resistor R22, which is connected between the output 14 of the operational amplifier N2 and the inverting input 13, serves for degenerative feedback. The non-inverting input 12 of the amplifier N2 is connected via a resistor R32 to the reference potential OV. This resistor R32, together with the resistor R31, forms a voltage divider for the reduction of the output voltage UA. The regulating voltage UR can be picked off at the output 14 of the amplifier N3. The output voltage UA thus remains constant until the maximum output current is reached. If a selectable threshold for the output voltage UA is crossed in the downward direction, as occurs in the event of a short-circuit or overload, with this circuit arrangement ASÜ, the set value of the regulating circuit, i.e. the value of the regulating voltage UR, is reduced (fold-back characteristic). The threshold is expediently set with the aid of the resistors R31, R32 and is typically three quarters of the output voltage UA. On dropping of the output voltage UA to a value down to three quarters of the set value, the monitoring circuit for the output voltage ASÜ remains inactive and the regulating of the output voltage UA is formed with the aid of a set/actual value comparator SIV, connected in parallel with the circuit arrangement ASÜ. Such a set-/actual value comparator SIV is known per se and may, for example, likewise be implemented with the aid of a differential amplifier. Because the regulating voltage UR is reduced by this measure, such a transformer is absolutely short-circuit-proof and the thermal loading in the event of a short-circuit is less than in the case of full load.

The set/actual value comparator SIV or the output voltage monitoring circuit ASÜ is followed by a simulation circuit SNB according to FIG. 6, which simulates the current IL in the inductance L2 during the charging of the inductance L2 as capacitor voltage. Due to such a current simulation for the current IL by the inductance L2, an effective current limitation in the case of overload of the transformer is achieved. For this purpose, the reference voltage UREF, the input voltage UE and the regulating voltage UR are available at the input of this simulation circuit SNB. The reference voltage UREF is connected via a resistor R11 to an inverting input 10 of a comparator N4 and via a further resistor R12 to the reference potential OV. The input voltage UE is connected via a resistor R13 and via a diode V13, poled in forward direction, both to an output 13 of the comparator N4, and to an inverting input 6 of a comparator N5, which is connected in turn via a capacitor C5 to the reference potential OV. The regulating voltage UR is passed via a resistor R20 to the non-inverting input 7 of the comparator N5, the output of which represents the driver voltage UT and which is fed back via a dynamic positive feedback, consisting of a series circuit of a resistor R47 and of a capacitor C16, to its non-inverting input 7.

The driver voltage UT is also available via a parallel circuit of a resistor R10 with a diode V12, poled in forward direction, at the non-inverting input 11 of the comparator N4. The input 11 is, moreover, connected via a capacitor C4 to the reference potential OV. At an instant t0 (cf. FIG. 7), when the secondary switched-mode regulator is switched on, the capacitor C5 serving as simulation capacitor for the choke current IL is discharged and the regulating voltage UR available at the non-inverting input 7 of the comparator N5 is greater than the voltage available at the inverting input 6. The output 1 of the comparator N5 is then at "high" potential and consequently a driver voltage UT is available, which controls the two switching transistors V1 and V2 into the conducting state. Consequently, the non-inverting input 11 of the further comparator N4 is also at higher potential than its inverting input 10 and consequently the output 13 of the comparator N4 is likewise at "high" potential. However, during the charging of the capacitor C5, this has no further effects, since the diode V13 is poled in reverse direction. The charge of the simulation capacitor C5 thus increases proportionally to the level of the input voltage UE. As a result, when the input voltage UE changes, synchronism between the voltage UC5 at the capacitor C5 and the current IL is achieved by the storage choke L2. Once the current IL has reached its peak value, i.e. the capacitor C5 has been charged, the voltage available at the inverting input 6 of the comparator N5 predominates over the regulating voltage UR and the output 1 of the comparator N5 has "low" level and, as a result, the two switching transistors V1 and V2 become blocked and $di_L/dt$ becomes less than zero. At the same time, the output 13 of the comparator N4 also has "low" level, since now the reference voltage UREF predominates and the capacitor C5 can discharge via the diode V13. The comparator N4 wired in this way thus has a discharging function for the capacitor C5. The capacitor C4, together with the resistor R10, forms a low-pass filter for time delay whenever the driver voltage UT jumps from "high" potential to "low" potential and acts as storage time simulation for the two switching transistors V1 and V2. If the driver circuit UT changes from "low" to "high" level, this time delay is ineffective due to the diode V12, which is now poled in forward direction and thus bypasses the resistor R10. The slope of the leading edge of the current IL due to the inductance L2 is proportional to the input voltage UE or the voltage at the capacitor C5 and is determined by the timing element of resistor R13 and capacitor C5, while the waveform of the current IL with blocked switching transistors V1 and V2 is independent of the level of the input voltage UE. This situation is represented in line 1 of FIG. 7 for two input voltages UE=18 V and UE=63 V at the same output voltage UE=38 V.

Furthermore, in FIG. 7, the voltages UCE1 and UCE2 at the collector-emitter junctions of the switching transistors V1 and V2, the voltage UL at the inductance L2 and the voltages UV11 and UV21 at the two diodes V11 and V12 are represented. In this case, the signal waveforms drawn in to the left of a dividing line TL apply to an input voltage UE less than UA, while to the right of this dividing line TL the above-denoted current or voltage wave forms are specified for a value of the input voltage UE which is greater than the desired output voltage UA. The instants t0 and t2 identify the turn-on times and t1 and t3 indicate the turn-off times of the transformer.

We claim:

1. Circuit arrangement for the conversion of an unregulated DC input voltage (UE) into a constant DC output voltage (UA), which has a common reference point (OV) with respect to its polarity, and with which the DC input voltage (UE) can assume both a higher and a lower value than the desired output voltage (UA), with an inductance (L2), serving as energy store for the conversion of the DC input voltage (UE) by alternating charging and discharging, and two switches (V1, V2), effecting the charging operation, a regulating circuit (RS), controlling the charging and discharging operation by periodic sensing, with a set/actual value comparator (SIV) for the setting of a pulse duty factor yielding the output voltage (UA), characterized in that a simulation circuit (SNB) is provided, which simulates a current (IL) through the inductance (L2) during the charging of the inductance (L2) as capacitor voltage (UC5) of a capacitor (C5), the capacitor (C5) being connected via a resistor (R13) to the input voltage (UE) and, as a result, the charging of the capacitor (C5) increasing proportionally to the level of the input voltage (UE), and synchronism between the capacitor voltage (UC5) and the current (IL) through the inductance (L2) being achievable when there are variations in the input voltage (UE), and in that the two switches (V1, V2) are switched off on reaching a certain value of the capacitor voltage (UC5).

2. Circuit arrangement according to claim 1, characterized in that the regulating circuit (RS) includes a common driver circuit (TRS), operating as switched constant current source, for both switches (V1, V2), which driver circuit actuates the two switches (V1, V2) simultaneously in the presence of a driver circuit (UT) by means of two driver signals (UT1, UT2).

3. Circuit arrangement according to claim 1, characterized in that an input voltage monitoring circuit (ESÜ) is provided, which switches off the secondary switched-mode regulator on dropping of the input value (UE) to values far below a permissible minimum voltage.

4. Circuit arrangement according to claim 1, characterized in that a circuit for the output voltage monitoring (ASU) is provided, which reduces the set value of the regulating voltage (UR) on crossing in the downward direction of a selectable threshold for the output voltage (UA).

5. Circuit arrangement according to claim 4, characterized in that the selectable threshold for the output voltage (UA) can be set with the aid of two resistors (R31, R32).

* * * * *

UNITED STATES PATENT AND TRADEMARK OFFICE
CERTIFICATE OF CORRECTION

PATENT NO.   : 4,967,138
DATED        : Oct. 30, 1990
INVENTOR(S)  : Obergfell et al.

It is certified that error appears in the above-identified patent and that said Letters Patent is hereby corrected as shown below:

Title page:
Section [86]: delete "PCT/DE88/00/56" and insert in its place --PCT/DE88/00156--.

Signed and Sealed this

Third Day of March, 1992

Attest:

HARRY F. MANBECK, JR.

*Attesting Officer*      *Commissioner of Patents and Trademarks*